Aug. 31, 1937.  F. H. OWENS  2,091,688
SOUND REPRODUCING APPARATUS
Filed March 26, 1929  4 Sheets-Sheet 4

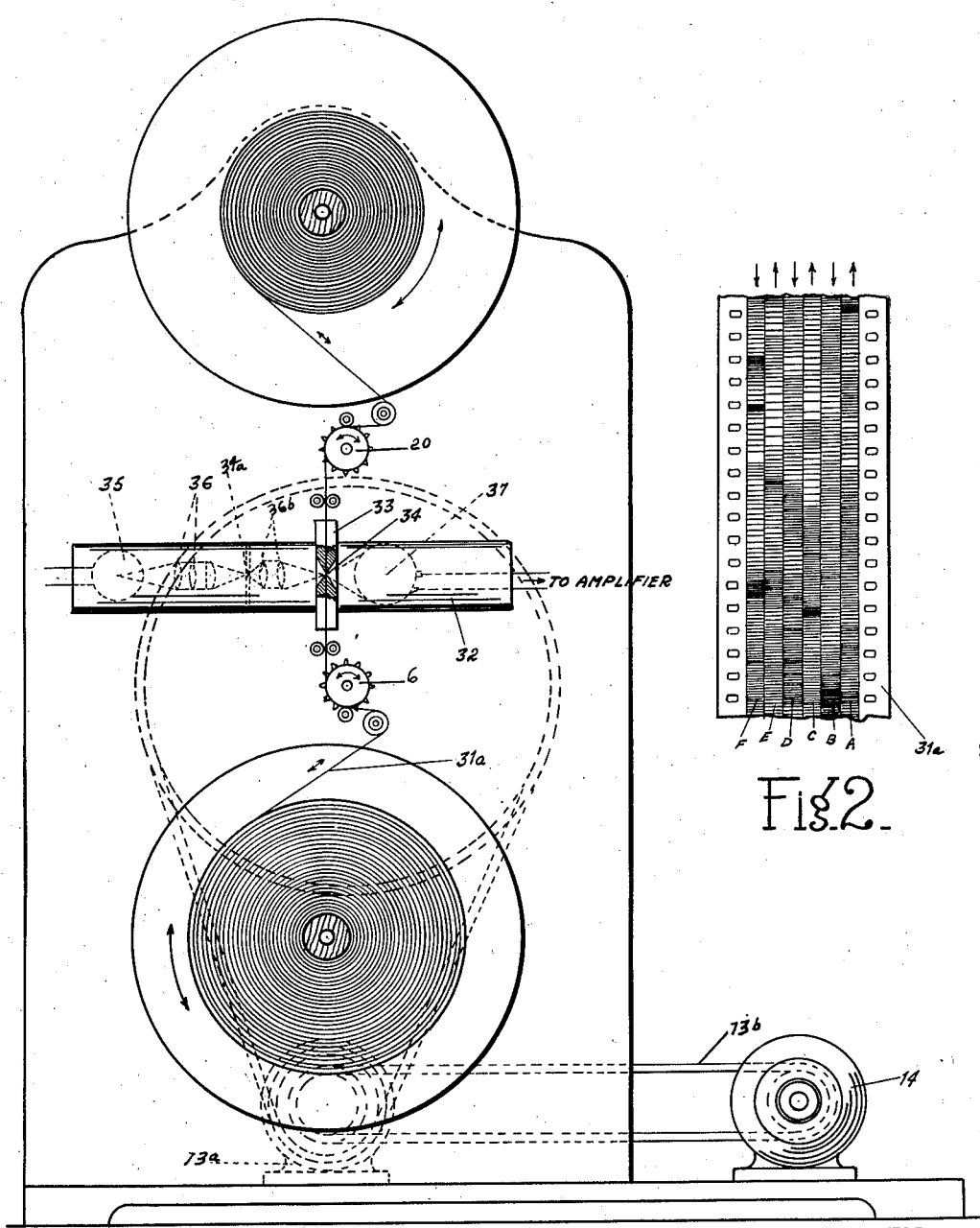

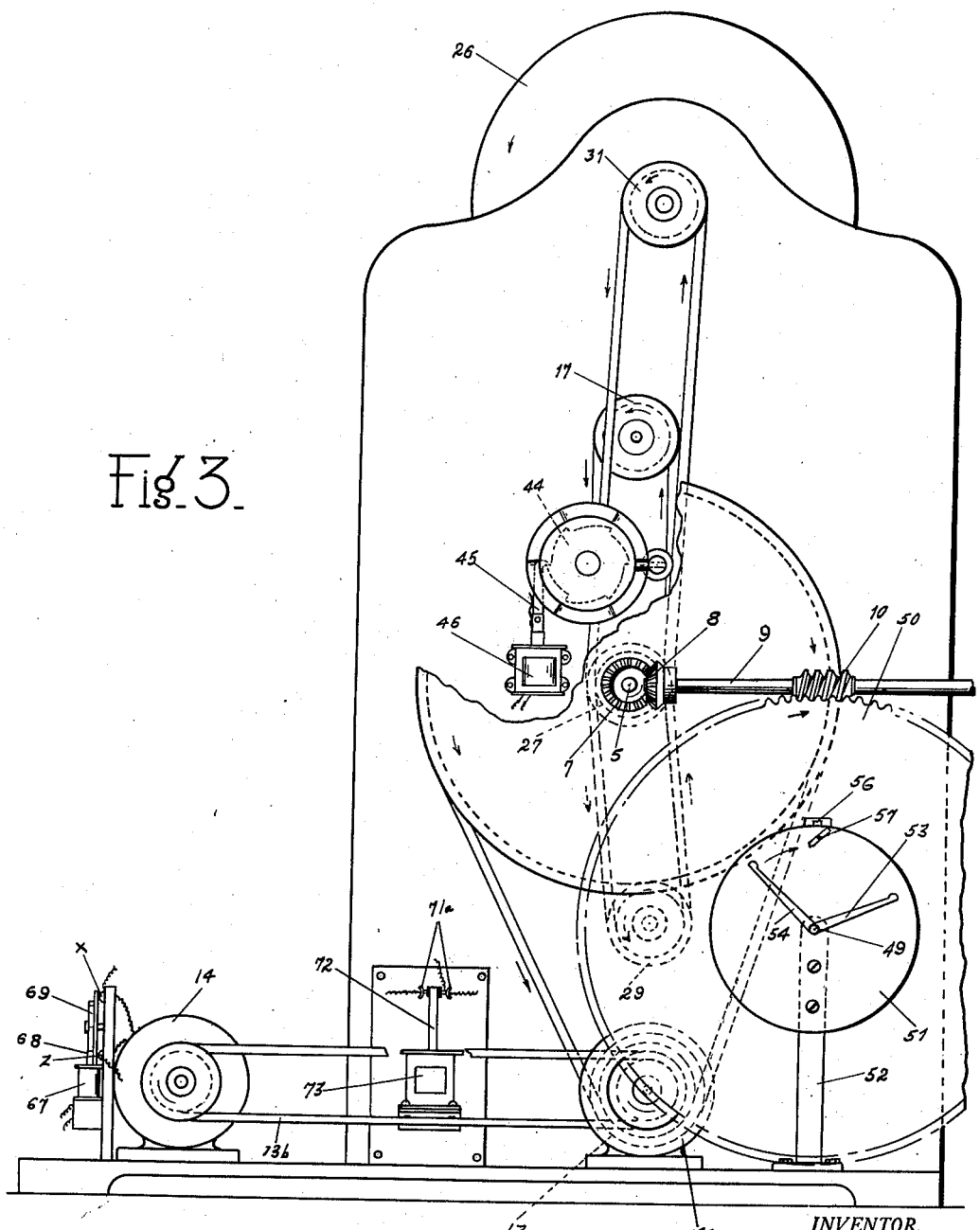

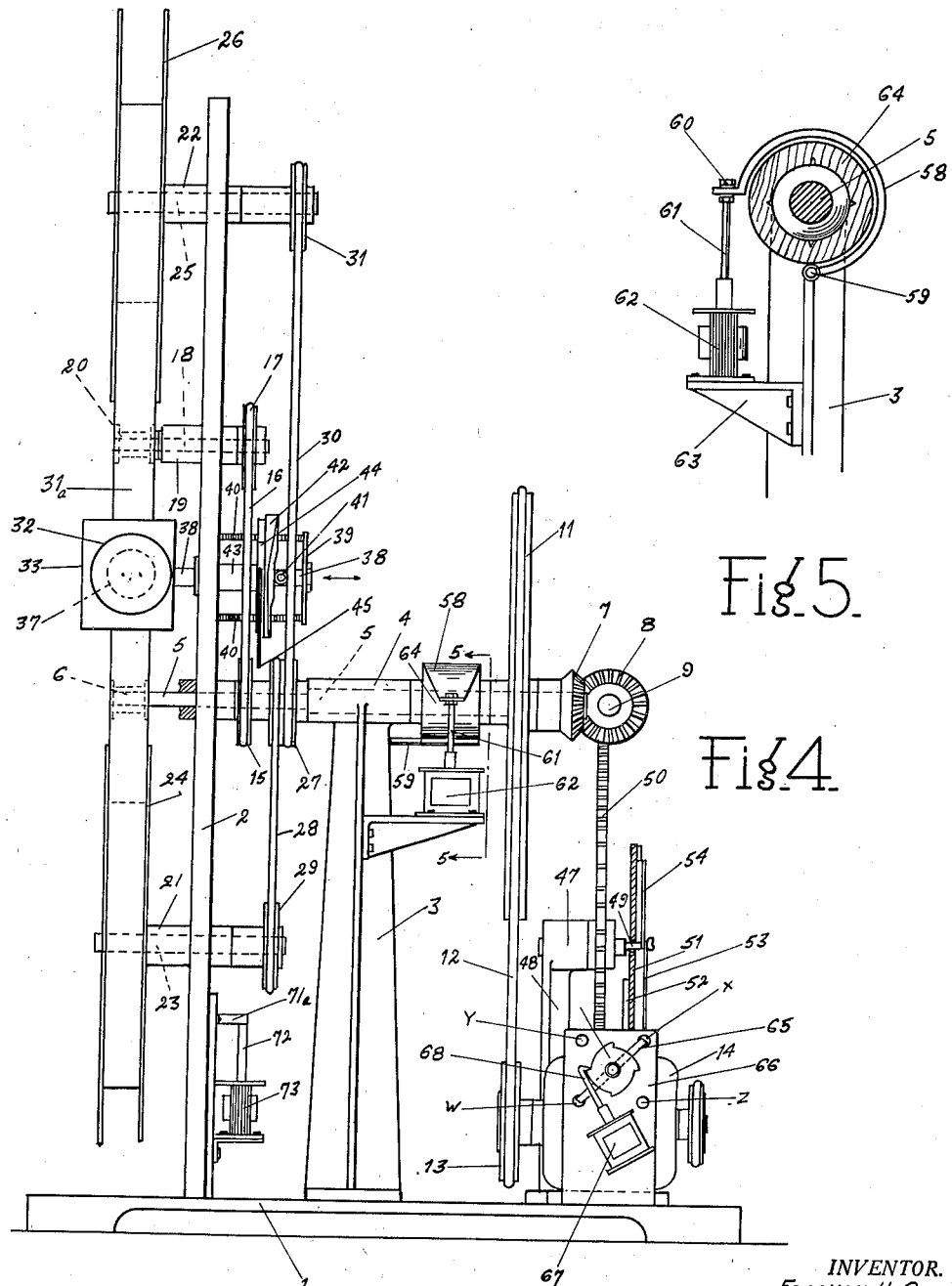

INVENTOR.
FREEMAN H. OWENS.
BY Philip S. Hopkins
ATTORNEY

Patented Aug. 31, 1937

2,091,688

UNITED STATES PATENT OFFICE 2,091,688

SOUND REPRODUCING APPARATUS

Freeman H. Owens, New York, N. Y.

Application March 26, 1929, Serial No. 349,983

6 Claims. (Cl. 179—100.3)

My invention relates to a sound reproducing apparatus and particularly to a means for the reproduction of photographic sound records.

My invention is particularly designed as an entertainer and has for its primary object the provision of an apparatus which readily lends itself to the reproduction of photographic sound records in churches, hotels, schools, clubs, dance halls, restaurants and in the home. To this end, the apparatus contemplates means for reproducing successively a plurality of photographic sound records on a single strip of film.

Another object of my invention is to make the controlling means for the reproducing apparatus automatic in character whereby a plurality of records will be reproduced in succession and without the assistance of an operator.

Still another object of my invention is to provide a novel shifting mechanism for the reproducing unit of the machine whereby at the conclusion of the reproduction of one record, the reproducing unit will move to proper position for the next record.

A further object is to provide means for shifting the direction of travel of the film upon which the sound records appear, at the end of the reproduction of each sound record.

Other objects and advantages in details of construction and arrangement of parts will be apparent as the description proceeds, reference now being had to the figures of the accompanying drawings forming a part of this application and wherein like reference numerals indicate like parts.

In the drawings:—

Figure 1 is a side view of my apparatus, many details being omitted for clearness.

Figure 2 is a detail view showing a section of a strip of film bearing sound records for reproduction in my new apparatus.

Figure 3 is a side view of my apparatus taken from the opposite side from that shown in Figure 1, and certain parts being broken away for clearness.

Figure 4 is an end view of my apparatus.

Figure 5 is a detail view illustrating the brake, one element of my apparatus.

Figure 6:
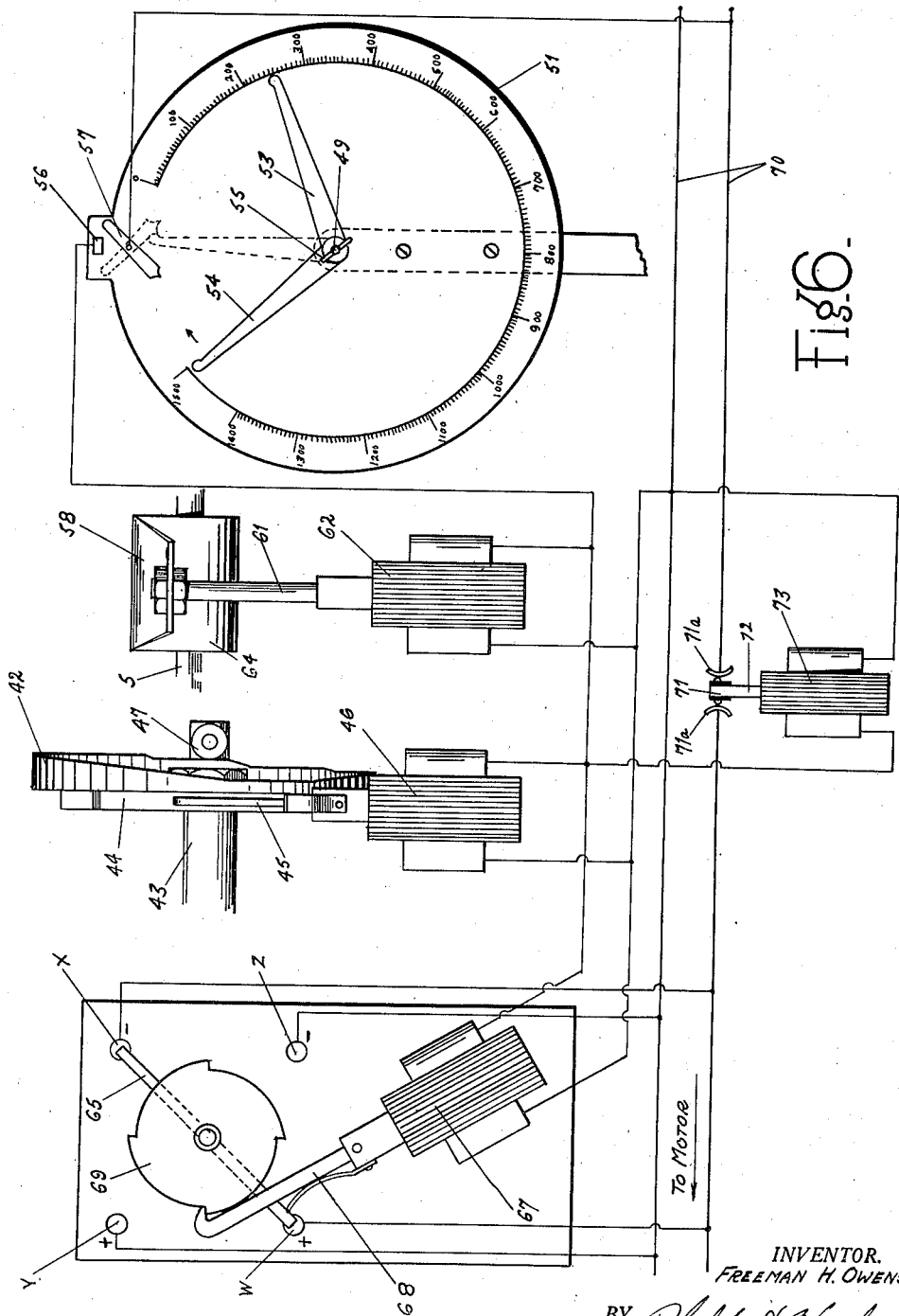
Figure 6 is a diagrammatic view illustrating the automatic control of my apparatus, and certain elements being shown in detail.

It should be clearly understood at the outset that the construction shown and described herein is illustrative only of one form which my invention may take, and has been purposely simplified for the purposes of illustration. Obviously, in the actual construction and practical operation of the invention, many changes will probably be made from that shown in the drawings. However, for purposes of illustration, the invention is believed to be clearly shown in the drawings, and will now be described.

There is provided a base plate 1, having an upstanding supporting plate 2, and an upstanding bearing arm 3, parallel to this plate. The arm 3 is provided at its upper end with a bearing 4 through which extends a shaft 5, such shaft also extending through the supporting plate 2, and provided on its extending end with a film sprocket 6. The opposite end of the shaft 5 is provided with a bevelled gear 7, meshing with a second bevelled gear 8, mounted upon a shaft 9, provided with a worm 10 for a purpose to be described.

Secured upon the shaft 5 adjacent the bevelled gear 7 is a large pulley wheel 11 which also serves as a fly or balance wheel. An endless belt 12 passes around this pulley wheel and also around a pulley 13 on the shaft of a governor 13a of conventional design, connected by belt 13b to an electric motor 14.

Also mounted upon the shaft 5 is a pulley 15 around which passes an endless belt 16 also engaging a pulley 17 mounted upon a shaft 18, journaled in the bearing 19 of the supporting plate 2, and extending therethrough. The extending end of the shaft 18 carries a film sprocket 20 in alignment with the film sprocket 6.

The supporting plate 2 is provided with bearings 21 and 22 at its lower and upper ends respectively. A shaft 23 is journaled in the bearing 21 and suitably mounted upon the shaft 23, for rotation thereby, is a film reel 24 in alignment with the film sprocket 6. Journaled in the bearing 22 is a shaft 25 suitably mounted upon which is a second film reel 26 in alignment with the film sprocket 20.

A double pulley 27 is mounted upon the shaft 5 and an endless belt 28 passes around said pulley and also around a pulley 29 mounted upon the shaft 23. An endless belt also passes around the double pulley 27 and around a pulley 31 mounted upon the shaft 25. Thus upon rotation of the shaft 5 by the motor, the film reels 24 and 26 will be rotated. Any suitable clutch (not shown) may be provided for the reels whereby to drive them positively in the "take up" direction and permit them to run idle when acting as the "supply" reel.

The film used in this apparatus is indicated at 31a and as shown clearly in Figure 2, is of the motion picture film variety upon which has been recorded a plurality of photographic sound records, the number of which is optional. In the form shown, there are provided six of these sound records indicated as A, B, C, D, E and F.

This film 31a is moved by means of the film sprockets 6 and 20, through a sound reproducing unit consisting essentially of a housing 32 which may be cylindrical in construction and which is provided centrally with a film gate 33. This film gate 33 through which the film passes is provided with a narrow slit or opening 34 as indicated in Figure 1, past which the film bearing the sound records passes. The details of this arrangement need not be enlarged upon except to say that the length of the slit 34 is substantially the same as the width of one of the sound records on the film.

Mounted in the tube 32 at one end thereof is a lamp 35 of constant intensity, the light rays from which pass through condenser lenses 36 and through the slit 34a, the areal image of which is then focused by the lens 36b upon the slit 34, at which point such rays are modulated by the particular sound record on the film 31a which is moving past such slit. These modulated light rays are then passed to a photoelectric cell or other light sensitive element 37 also mounted within the tube 32, such photoelectric cell controlling a circuit to a suitable amplifier and loud speaker device whereby the recorded sound from the film may be rendered audible.

The reproducing unit contained within the tubular housing 32 is adjustable with respect to the film 31a whereby the slit 34 may be moved laterally of the film to uncover successively the sound records A, B, C, D, E and F. To this end, it will be noted from reference to Figure 4 that the housing 32 is carried by a slidable rod 38, journaled in the supporting plate 2, and provided at its opposite end with a cross piece 39 to which are attached coiled springs 40, anchored at their opposite ends to the supporting plate 2, whereby to normally urge the rod 38 and the reproducing unit to the left in Figure 4. Means are provided however, for shifting the unit to the right in Figure 4, step by step, whereby to successively present a new sound record before the slit 34. This means includes a roller 41 mounted upon the shaft 38, said roller engaging with the cam surface of a disk 42, suitably rotatably journaled upon a bearing 43 on the supporting plate 2. Secured to the cam disk 42 is a toothed ratchet 44, engageable with the teeth of which is a pawl 45 carried by the armature of a solenoid 46. Obviously, therefore, when the solenoid 46 is energized and the pawl 45 is pulled downwardly, the ratchet 44 will rotate the distance of one tooth thereof, also rotating the cam disk 42. As the cam disk 42 rotates, the roller 41 riding upon the surface thereof will move the rod 38 and consequently the reproducing unit inwardly or outwardly, depending upon the position of the roller with respect to the cam surfaces of the disk. The cam steps on the disk 42 are so arranged as to permit movement of the reproducing unit a proper distance to bring the slit 34 into alignment with one of the sound records at a time.

The means for the automatic control of this apparatus will now be described:—

Rotatably mounted in a bearing 47 (see Figure 4) carried at the upper end of a bracket 48 extending upwardly from the base 1, is a shaft 49, upon which is mounted a large worm gear 50, meshing with the worm 10 on the shaft 9. The shaft 49 extends centrally through a stationary dial 51 suitably secured to a bracket 52. This dial 51 is calibrated with footage numbers to correspond to the length of the film 31a. Mounted upon the end of the shaft 49 in position to move over the surface of the dial 51, are the adjustable arms 53 and 54 adapted to be locked in adjusted position on the shaft by means of the wing nut 55. It will be understood of course, that the calibrations on the dial 51 and the gear ratio controlling the movements of the shaft 49 and the arms 53 and 54, is so proportioned as to accurately represent the footage travel of the film 31a.

At the top of the dial 51 there is provided an electric contact strip 56 of a predetermined length, and pivoted to the dial 51 adjacent the stationary contact 56, is a movable contact arm 57, adapted to be moved across the contact 56 by either of the arms 53 or 54, depending upon which direction the shaft 49 is traveling. The contact 57 may be in the form of a brush or wiper element which while moving across the stationary contact 56, closes an electric circuit for the operation of certain elements about to be described. When the contact 57 moves off of and out of engagement with the contact 56, such circuit is broken as will be more fully explained.

A braking device is provided for the main driving shaft 5, whereby to greatly retard and slow down the film winding mechanism at the end of each of the film records. This braking device consists of a flexible strap member 58 (see Figure 5), fixed at one end to a pin 59 rigid with the supporting bracket 3. The opposite end of the strap 58 is secured as at 60 to the upper end of the armature 61 of a solenoid 62, supported upon a bracket 63 carried by the supporting member 3. The strap 58 encircles a braking surface 64 of wood, fiber or other suitable material mounted upon the shaft 5. Obviously, therefore, when the circuit to the solenoid 62 is closed, the armature 61 will be drawn downwardly applying the brake strap 58 to the surface of the material 64, whereby to retard the rotation of the shaft 5.

Means are also provided for changing the direction of rotation of the shaft of the motor 14 whereby to reverse the rotation of the shaft 5, and consequently the direction of movement of the film 31. This means includes a pivoted contact arm 65, provided with contacts at each end and rotatably supported upon a plate 66, carried by the base 1. Four stationary contacts are provided on the plate 66, two of which W and X, are connected electrically with the windings of the motor in such manner that when the contact arm 65 moves into engagement with such contacts W and X, the circuit will be closed to the motor, resulting in the rotation of the motor shaft in one direction. The other two stationary contacts Y and Z also have electrical connections to the windings of the motor, whereby when the contact arm 65 is moved into engagement with such contacts, the circuit will be closed in such manner that the motor will rotate its shaft in the opposite direction. A solenoid 67 is provided with a pawl 68, engageable with the teeth of the ratchet 69, carrying the movable contact member 65, whereby when the solenoid 67 is energized, the contact arm 65 will shift from one set of contacts to the other, and thus change the direction of rotation of the motor shaft.

With particular reference now to Figure 6 of the drawings, the operation of my automatic control will be described.

Let the reference character 70 indicate the source of electric current, which may be any suitable voltage, as for instance, a line current of 100 volts A. C. This current is led to the motor 14, through the medium of the contact arm 65 in cooperation with the contacts WX and Y and Z. Interposed in this circuit, is a movable contact member 71 mounted upon the end of the armature 72 of a solenoid 73 which is normally deenergized, and with the contact 71 therefor normally closing the circuit to the motor so that the current will upon operation of the usual manually controlled switch for the machine, flow through the motor.

Assuming now that a reel of film 31a having a length of 1000 feet is mounted upon the reels 24 and 26, and bearing the sound records as indicated for reproduction, the arms 53 and 54 on the shaft 49 are then adjusted for such length. In other words, so adjusted that upon rotation of the shaft 49, a distance equivalent to the 1000 feet of film, one of the arms 53 or 54, depending upon the direction of rotation of the motor, will engage with the movable contact 57 and move it across the stationary contact 56. Assuming then that the contact arms 53 and 54 are moving to the right in Figure 6, and the 1000 feet of film has been wound through the reproduction unit, the arm 54 will therefore engage with the lower end of the pivoted contact 57 and move the same on its pivot as shown in dotted lines in Figure 6. As the arm 54 moves the contact 57 into engagement with the stationary contact 56, several elements are operated and although they are operated approximately simultaneously, such operations will be described in order. First, as the contact 57 is moved into engagement with the contact 56, a circuit will be closed to the solenoid 73 energizing the same and drawing the armature 73 and the contact 71 inwardly. This breaks the circuit to the motor 14 as long as the contact 57 is engaged with the contact 56.

Also upon engagement of the contact 57 with the stationary contact 56, a circuit is closed to the solenoid 62 energizing the same and causing the armature 61 to draw downwardly and thus exert a braking action upon the shaft 5, whereby to overcome the rotation of the shaft 5 and the inertia of the fly wheel 11 thereon. It may be observed that the weight on the fly wheel 11 is such that the application of the brake 58 does not stop the shaft 5 at once but gradually slows it down or retards its rotation so that when the motor is started in the opposite direction the direction of rotation of the shaft 5 will be effected also. Engagement of the contact 57 with the contact 56 also closes the circuit to the solenoid 46, energizing the same and pulling downwardly the pawl 45 carried by the armature thereof. This, of course, rotates the ratchet 44 and the cam disk 42, resulting in shifting the reproducing unit laterally one step whereby to bring the slit 41 into alignment with the next sound record on the film 31a. When the last record on the film has been reproduced, the rotation of the cam and the step arrangement on the cam face, permits the return of the reproducing unit to position over the first record, under the influence of the springs 40.

Lastly, the moving of the contact 57 into engagement with the contact 56 closes a circuit to the solenoid 67, thereby energizing the same and causing the pawl 68 carried by the armature thereof to be pulled downwardly thus rotating the ratchet 69 and consequently the contact arm 65 carried thereby. This rotation brings the contact arm out of engagement with the contacts W and X and into engagement with the contacts Y and Z, whereby when the current again flows to the motor 14, the direction of rotation thereof will be changed from that immediately preceding.

It will be noted that the operation of the solenoids 62, 46 and 67 all take place during the time the current is cut off from the motor by virtue of the contact 71 being drawn down out of engagement with the contacts 71a in the motor line. Therefore, by the time that the contact arm 57 is moved across the contact 76 under the influence of the arm 54, the current to the motor will have been broken, the brake will have been applied to the shaft 5, the reproducing unit will have been shifted to a new reproducing position with respect to the film and the motor contacts changed so as to reverse the direction of rotation thereof when the current is again admitted to the motor. The timing of the operation of these various elements is so arranged that the rotation of the shaft 5 will have become very slow by the time the arm 57 moves out of engagement with the contact 56. As before stated however, the inertia of the fly wheel 11 is such that the rotation of the shaft 5 and consequently of the shaft 49 and the arms 53 and 54 will continue to rotate sufficiently to cause the contact arm 57 to move across and out of engagement again with the contact 56. Promptly upon the movement of the contact arm 57 past and out of engagement with the contact 56 the solenoid 73 will be de-energized and the armature 72 thereof again forced outwardly whereby the contact 71 again closes the circuit to the motor 14. Obviously, therefore, when this circuit is again closed the motor will start operating in the opposite direction. Also, it will be clear that as soon as the contact arm 57 moves out of engagement with the contact 56, the solenoids 52, 46 and 67 will be de-energized with the result that the brake is relieved from the shaft 5, and the pawl of the other solenoids will assume their normal position, ready to rotate their respective ratchets when again energized.

Thus it will be seen that upon the completion of the reproduction of one of the sound records on the film, the direction of movement of the film is reversed, and the reproducing unit is shifted to reproduce the next adjacent sound record, which action is repeated until all of the records have been reproduced and then the cycle begun again.

It will be understood, of course, that many changes may be made in details of construction and arrangement of parts without departing from the spirit and scope of my invention. I do not limit, myself, therefore, to the exact structure herein shown and described other than by the appended claims.

I claim:

1. A sound reproducing apparatus comprising film moving sprockets operable to move a film bearing a plurality of photographic sound records, laterally shiftable means, including a light source and a light sensitive element between which said film moves, for reproducing said sound records, and means for shifting said reproducing means to bring the same into alignment with one of said sound records, said shifting means comprising a cam in engagement with said shiftable means.

2. A sound reproducing apparatus comprising film moving sprockets operable to move a film bearing a plurality of photographic sound records, laterally shiftable means, including a light source and a light sensitive element between which said film moves, for reproducing said sound records, a common support for said light source and said element, and means for shifting said support to bring said source and element into registry with one of said sound records.

3. A sound reproducing apparatus comprising film moving sprockets operable to move a film bearing a plurality of photographic sound records, laterally shiftable means, including a light source and a light sensitive element between which said film moves, for reproducing said sound records, a common support for said light source and said element, and means for shifting said support to bring said source and element into registry with one of said sound records, said shifting means comprising a cam in engagement with said support.

4. A sound reproducing apparatus comprising film moving sprockets operable to move a film bearing a plurality of photographic sound records, laterally shiftable means, including a light source and a light sensitive element between which said film moves, for reproducing said sound records, a common support for said light source and said element, means for shifting said support to bring said source and element into registry with one of said sound records, said shifting means comprising a cam in engagement with said support, and means for automatically actuating said shifting means at predetermined times.

5. A sound reproducing apparatus comprising film moving sprockets operable to move a film bearing a plurality of photographic sound records, laterally shiftable means, including a light source and a light sensitive element between which said film moves, for reproducing said sound records, a common support for said light source and said element, means for shifting said support to bring said source and element into registry with one of said sound records, said shifting means comprising a cam in engagement with said support, means for automatically actuating said shifting means at predetermined times, and means operable in timed relation with said shifting means for reversing the direction of rotation of said film moving sprockets.

6. A sound reproducing apparatus comprising film moving sprockets operable to move a film bearing a plurality of photographic sound records, a laterally shiftable light source, a light sensitive element, said film being movable therebetween for successively reproducing said sound records, means for shifting said light source at predetermined times, a film footage measuring device, and means operable by said device for actuating said shifting means.

FREEMAN H. OWENS.